United States Patent [19]
Patron et al.

[11] 3,898,175
[45] Aug. 5, 1975

[54] CATALYTIC SYSTEMS USEFUL FOR THE BULK OR SOLUTION POLYMERIZATION OF ETHYLENICALLY UNSATURATED MONOMERS

[75] Inventors: Luigi Patron; Alberto Moretti, both of Venezia; Raffaele Tedesco; Gilberto Brocca, both of Mestre, all of Italy

[73] Assignee: Montedison Fibre S.p.A, Milan, Italy

[22] Filed: May 22, 1973

[21] Appl. No.: 362,665

[30] Foreign Application Priority Data
May 23, 1972 Italy................................ 24700/72

[52] U.S. Cl...... 252/428; 260/85.5 ES; 260/88.7 D; 260/89.1; 260/89.5 A
[51] Int. Cl. ............................................ C08f 3/76

[58] Field of Search................ 252/428; 260/88.7 D

[56] References Cited
UNITED STATES PATENTS

| | | | |
|---|---|---|---|
| 3,058,937 | 10/1962 | Furness..................... | 260/88.7 D X |
| 3,200,100 | 8/1965 | Dennstedt.................. | 260/88.7 D X |
| 3,575,888 | 4/1971 | Long................................. | 252/443 |

*Primary Examiner*—Patrick P. Garvin

[57] ABSTRACT

Catalytic systems of the radical type and comprising a plurality of components are disclosed. The components are hydrogen peroxide, sulphur dioxide or other reducing sulphur compound, and an aldehyde. The systems are particularly suitable for the bulk or solution polymerization of various ethylenically unsaturated monomers with high polymerization rates at both low and high polymerization temperatures.

3 Claims, No Drawings

CATALYTIC SYSTEMS USEFUL FOR THE BULK OR SOLUTION POLYMERIZATION OF ETHYLENICALLY UNSATURATED MONOMERS

THE PRIOR ART

Many free radical polymerization initiators are known in the prior art. Conventionally, they are classified as initiators having one component and initiators having a plurality of components — i.e., more than one component. Those belonging to the first group become active on thermal decomposition thereof, while those belonging to the second group become active as a result of mutual reaction of the components of which they are comprised.

In general, the initiators having more than one compound are preferred because they permit a wider and easier regulation of the polymerization rate and of the molecular weight of the polymer produced. In some instances, also, the multi-component initiators result in a higher polymerization rate particularly at low temperature.

THE PRESENT INVENTION

One object of this invention was to provide new multi-component catalytic systems that function as efficient polymerization initiators at both low and high polymerization temperatures and which would result in high yields of very white, heat-stable polymers.

This and other objects are accomplished by the invention which provides new catalytic systems comprising a. hydrogen peroxide;
b. sulphur dioxide or other reducing sulphur compound which is soluble in the reaction medium and in which the sulphur has a valency not greater than 4; and
c. an aldehyde of the general formula:

$$R - \overset{H}{\underset{|}{C}} = O \quad (1)$$

wherein

R is hydrogen or an alkyl radical containing 1 to 5 carbon atoms.

We have found that the catalytic systems as aforesaid generate free radicals capable of initiating the polymerization of the ethylenically unsaturated monomers at any temperature comprised between +70°C and −20°C, and that the polymers obtained with the aid thereof are very white and have high heat-stability.

The quantity of hydrogen peroxide required to attain the objects of our invention is, in general, quite small, although the amount is always a catalytic amount. In general, it is not greater than 3 percent by weight with respect to the monomer or mixture of monomers to be polymerized. A suitable and preferred quantity of hydrogen peroxide is comprised between 0.01 and 1.0 percent by weight.

As indicated, other reducing sulphur compounds which are soluble in the reaction medium may be used as component (b) of the system instead of sulphur dioxide, provided that in such compounds the sulphur has a valency not greater than 4. Examples of such compounds are: sulphites, mono- and di-alkyl-esters, or mono- and di-aryl esters, of sulphurous acid, bisulphites, thiosulphates, sulphoxylates, etc.

The concentration of sulphur dioxide or other sulphur compound depends on the amount of hydrogen peroxide and is such that the molar ratio between the $SO_2$ or other sulphur-containing reducing compound and $H_2O_2$ is between 1:15 and 15:1, preferably between 0.5:1 and 10:1.

Aldehydes useful as component (c) of the present catalytic systems include formaldehyde, acetaldehyde, propionaldehyde, n-butyraldehyde, iso-butyraldehyde, and iso-valeraldehyde. In the presently preferred embodiment, component (c) is acetaldehyde, which is easy to prepare and yields good results.

The amount of aldehyde used may vary within a rather wide range. In general, we have noted that an increase in the concentration of the aldehyde in the catalytic systems of the invention causes an increase in the polymerization conversion. In practice, the aldehyde is used in a concentration such that the aldehyde/$H_2O_2$ molar ratio is between 0.5 and 15.

Due to the high reactivity thereof, the catalytic systems of our invention can be used as initiators of the bulk or solution polymerization of any ethylenically unsaturated monomers containing the group:

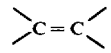

More particularly, the systems can be used as initiators of the bulk or solution polymerization of ethylenically unsaturated monomers or mixture of monomers having the general formula:

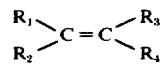

wherein $R_1$, $R_2$, $R_3$ and $R_4$, which may be the same or different, represent hydrogen, halogen such as chlorine, bromine or fluorine, substituted or unsubstituted saturated or unsaturated alkyl radicals, substituted or unsubstituted saturated or unsaturated aromatic radicals, aryl radicals, substituted or unsubstituted heterocyclic radicals, ether groups, carboxylic groups, amidic groups, alkyl-oxy-carbonylic groups, aryl-oxy-carbonylic groups, nitryl groups, ketone groups, thioether groups, sulphone groups, alkyl-carbonyl-oxy groups, aryl-carbonyl-oxy groups, etc.

Examples of such monomers include vinyl or vinylidene esters such as formate, acetate, propionate, benzoate of vinyl or of vinylidene; acrylic acid and its derivatives such as alkyl acrylates, acrylamides, acrylonitrile, methacrylonitrile, etc.; the vinyl ketones such as vinyl-methylketone; vinyl ethers such as vinylethylether; vinylsulphones such as vinylphenylsulphone; heterocyclic compounds substituted by a vinyl group such as the vinylpiridines, and the vinyl-pyrrolidones; the vinyl thioethers such as vinylethylsulphide; hydrocarbon compounds such as divinyl-benzene, ethylene, butadiene; vinyl or vinylidene compounds containing chlorine, bromine and fluorine such as vinyl chloride, vinylidene chloride, vinyl bromide, vinyl fluoride, etc.

These monomers may not only be homopolymerized but also copolymerized with each other or with copolymerizable resins such as unsaturated polyesters.

The catalytic systems which are the object of this invention show, moreover, a decomposition rate constant of 5 $h^{-1}$, determined on the basis of the semi-decomposition time in a discontinuous process (see method described in copending U.S. application Ser. No. 136,901 filed April 23, 1971, now U.S. Pat. No. 3,787,365; and in the CIP of said application Ser. No. 136,901, now U.S. Pat. No. 3,839,288).

Since the decomposition rate is greater than 1 $h^{-1}$, the catalytic systems of this invention are suited for use in the bulk polymerization of acrylonitrile, provided that all other conditions prescribed in copending U.S. application Ser. No. 136,901 (now U.S. Pat. No. 3,787,365; and in the continuation in part of said application Serial No. 136,901, now U.S. Pat. No. 3,839,288) remain satisfied, that is provided that:

a. the polymerization is carried out continuously or semicontinuously;
b. the reaction time (Q) is at least sufficient for the semi-decomposition of the catalyst; and
c. a catalyst concentration at least equal to $2.10^{-3}$. Q moles/lt, wherein Q is the reaction time in hours, is used.

By the term "bulk polymerization" as used herein is meant not only the polymerization carried out in the undiluted monomer, but also in the presence of possible small quantities of organic compounds, non-reactive with the catalytic system, liquid at the polymerization temperature and which exert a fluidizing action on the polymerization mass, in order to make this latter more easily stirrable and to facilitate the heat exchange through the walls of the polymerization reactor. As fluidizing agents the following substances may be used:

aliphatic hydrocarbons, aryl-hydrocarbons, cycloalkylhyrocarbons, halogenated saturated hydrocarbons, etc.

It is understood that in the case of bulk polymerization, it is necessary to use those sulphur compounds as defined herein that are soluble in the reaction medium.

By the term "solution polymerization" is meant the polymerization carried out in the presence of organic compounds which are liquid at the polymerization temperature and solvents of the polymer. The choice of the organic liquid solvent compound depends on the type of monomer to be polymerized.

Thus, for instance, when the monomer to be polymerized is acrylonitrile, the organic solvent may be chosen from the group comprising:

N,N-dimethylformamide, N,N-dimethylacetamide, γ-butyrrolactone, dimethyl-sulphoxide, ethylene carbonate, etc.

In case the monomer to be polymerized is acrylic acid, the solvent may be aliphatic alcohol having from 1 to 4 carbon atoms.

The proportion of the monomer in the solution is conveniently comprised between 10 and 60 percent.

Small quantities, for instance from 50 to 1,000 ppm, of an alkyl-mercaptan may be fed into the polymerization mass for regulating the molecular weight of the polymer.

It is advisable to conduct the polymerization in the absence of oxygen which exerts an inhibiting action on the polymerization. In general, for this purpose suitable inert gases such as nitrogen, are used for eliminating the air from the polymerization reactor.

The polymerization may be conducted either in a continuous, semi-continuous or discontinuous way.

Because of the high reactivity of the catalytic system used in practicing this invention, it is possible to attain high conversion polymerizations also at temperatures below 0°C with small quantities of the catalytic system, and thus to obtain polymers which are practically free of catalyst residues.

The following examples, given to illustrate the invention, are not intended to be limiting.

EXAMPLE 1

Into a 2.5 liters polymerization reactor, containing 2000 g of one of the monomers listed in Table I, maintained at the temperature reported in the Table, were admixed, in 2 hours and under stirring and a nitrogen atmosphere, 4 g of hydrogen peroxide, 7.45 g of $SO_2$ and 5 g of acetaldehyde. Thereupon the reaction mass was discharged and the polymer recovered.

The polymerization temperatures, the polymerization con versions of each monomer, and the specific viscosities of the polymers thus obtained are shown in Table I.

TABLE I

| Monomer | Polymerization Temperature °C | Conversion in % | Specific viscosity in dl/g |
|---|---|---|---|
| Acrylonitrile | −10 °C | 10 | 1.0 ° |
| Vinyl-acetate | +25 °C | 46.4 | 0.52 ∞ |
| Methyl-acrylate | +25 °C | 60.2 | 1.8 ∞ |

° Determined in a 0.1% dimethylformamide solution at 30°C.
∞ Determined in a 0.1% acetone solution at 30°C.

EXAMPLE 2

Into a 2500 cc polymerization reactor, provided with a stirrer, an overflow pipe, a cooling system and a thermometer, and pro-loaded to half its volume with a mixture consisting of 83 percent of acrylonitrile and 17 percent of vinyl acetate (water content of the mixture - 0.3% by weight), and heated at 45°C, were continuously fed in:

| | | |
|---|---|---|
| hydrogen peroxide | = | 1 g/hr. |
| gaseous $SO_2$ | = | 2 g/hr. |
| acetaldehyde | = | 1 g/hr. |

The polymerization temperature was 45°C and was maintained constant by a thermostatic bath.

After the first 30 minutes, also the monomer mixture was fed in at a flow rate of 2000 g/hr. After another 30 minutes, the polymerization suspension started to discharge through the overflow pipe and was then filtered.

Under stationary conditions the polymer thus obtained, after washing with water and drying at 60°C for 24 hours, showed a specific viscosity of 3.0 dl/g, determined in 0.1 percent dimethylformamide solution at 25°C, and a content in copolymerized vinyl acetate of 6 percent.

The polymerization conversion amounted to 30 percent.

EXAMPLE 3

Example 2 was repeated, with the difference, however, that the acetaldehyde was increased to 3.2 g/hr, the polymerization conversion rose to 40 percent and the specific viscosity of the polymer amounted to 2.8 dl/g.

EXAMPLE 4

Into a 2.5 liters polymerization reactor fitted with a stirrer, a cooling system, a thermometer and an overflow pipe, and pre-loaded with 1000 g of acrylonitrile containing 0.3 percent by weight of water, and maintained at 60°C, were continuously fed in:

| | | |
|---|---|---|
| hydrogen peroxide | = | 4 g/hr. |
| SO$_2$ | = | 18 g/hr. |
| acetaldehyde | = | 46 g/hr. |

After the first 30 minutes, acrylonitrile was also contemporaneously fed at a flow rate of 4000 g/hr (the acrylonitrile has a density of 0.8 g/cc).

The polymerization conversion amounted to 40 percent and the obtained polymer had a specific viscosity of 2.0 dl/g.

EXAMPLE 5

Into a 2.5 liters polymerization reactor containing 1000 g of acrylonitrile and 1000 g of dimethylformamide, maintained at 25°C, were fed in:

| | | | |
|---|---|---|---|
| hydrogen peroxide | = | 2 | g |
| sulphur dioxide | = | 3.77 | g |
| acetaldehyde | = | 2.6 | g |

The reactor was maintained under constant stirring in a nitrogen atmosphere, for 2 hours.

The reaction mass was thereupon discharged from the reactor and the polymer was recovered by precipitation in ethyl alcohol.

The polymerization conversion amounted to 20% and the polymer showed a specific viscosity of 1.3 dl/g.

EXAMPLE 6

Example 5 was repeated at a temperature of −10°C. The polymerization conversion amounted to 5 percent.

We claim:

1. Catalytic systems useful in the bulk or solution polymerization of ethylenically unsaturated monomers at any temperature from +70°C to −20°C, and consisting of hydrogen peroxide, sulphur dioxide, and an aldehyde having the general formula

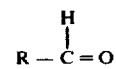

in which R is hydrogen or an alkyl radical containing from 1 to 5 carbon atoms, the sulphur dioxide/hydrogen peroxide molar ratio being from 1:15 to 15:1 and the aldehyde/hydrogen peroxide molar ratio being from 0.5 to 15.

2. A catalytic system according to claim 1, characterized in that the aldehyde is acetaldehyde.

3. A catalytic system according to claim 1, characterized in that the molar ratio sulphur dioxide/hydrogen peroxide is comprised between 0.5:1 and 10:1.